(12) United States Patent
Johansson et al.

(10) Patent No.: US 9,883,482 B2
(45) Date of Patent: Jan. 30, 2018

(54) SIGNALING OF CORE NETWORK RESTART TO WIRELESS DEVICES

(71) Applicant: TELEFONAKTIEBOLAGET LM ERICSSON (PUBL), Stockholm (SE)

(72) Inventors: Nicklas Johansson, Brokind (SE); John Walter Diachina, Garner, NC (US); Mårten Sundberg, Årsta (SE); Olof Liberg, Stockholm (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 15/060,214

(22) Filed: Mar. 3, 2016

(65) Prior Publication Data

US 2016/0262130 A1 Sep. 8, 2016

Related U.S. Application Data

(60) Provisional application No. 62/128,867, filed on Mar. 5, 2015.

(51) Int. Cl.
*H04W 4/00* (2009.01)
*H04W 68/02* (2009.01)
(Continued)

(52) U.S. Cl.
CPC ......... *H04W 68/02* (2013.01); *H04L 41/0672* (2013.01); *H04W 52/0274* (2013.01);
(Continued)

(58) Field of Classification Search
CPC ....... H04L 63/10; H04L 63/101; H04L 67/22; H04L 63/1425; H04L 67/303;
(Continued)

(56) References Cited

U.S. PATENT DOCUMENTS

2009/0046577 A1* 2/2009 Marin ..................... H04L 47/10
370/219
2010/0113027 A1* 5/2010 Hsu .................... H04W 36/0005
455/436

(Continued)

FOREIGN PATENT DOCUMENTS

WO WO 2016/007070 A1 1/2016
WO WO 2016/028215 A1 2/2016

OTHER PUBLICATIONS

Disco: "Discussion on Comparison of Pro-active and Re-active paging approach," 3GPP draft; C4-102053; vol. CT WG4, Xian; Aug. 13, 2010.
(Continued)

*Primary Examiner* — Nimesh Patel (57) ABSTRACT

A radio access network node and methods are described herein for signaling an indication of a network restart to wireless devices within a cellular network. In one embodiment, the radio access network node is operable to: (1) signal, to the wireless devices, an indication that a network restart has occurred in a core network node in a pool of core network nodes in the cellular network; and (2) receive, from at least one of the wireless devices, a re-registration message in response to the signaling of the indication that the network restart has occurred. The wireless device and methods implemented by the same are also described herein.

28 Claims, 3 Drawing Sheets

(51) Int. Cl.
*H04L 12/24* (2006.01)
*H04W 52/02* (2009.01)
*H04W 76/02* (2009.01)
*H04W 60/04* (2009.01)
*H04W 8/30* (2009.01)

(52) U.S. Cl.
CPC ............ *H04W 76/028* (2013.01); *H04W 8/30* (2013.01); *H04W 60/04* (2013.01); *Y02B 60/50* (2013.01)

(58) Field of Classification Search
CPC ..... H04L 67/32; H04L 43/0811; H04L 43/16; H04L 65/607; H04L 65/80; G06F 17/30082; G06F 21/6218; G06F 11/3006; G06F 2216/03; H04W 24/04; H04W 76/028; H04W 88/02; H04W 88/06; H04W 88/08; H04W 52/0254; H04W 52/0264; H04W 72/005; H04W 64/00; H04W 76/02; H04W 84/005; H04W 52/0274; H04W 72/04; H04W 84/045; H04W 36/08; H04W 8/04; H04W 8/12; H04W 60/00; H04W 68/00; H04W 68/02; H04W 8/06; H04W 24/02; H04W 36/14; H04W 48/18; H04W 48/20; H04W 52/40; H04W 60/04; H04W 36/18
See application file for complete search history.

(56) References Cited

U.S. PATENT DOCUMENTS

2011/0170466 A1* 7/2011 Kwun ............... H04W 52/0235 370/311
2013/0083670 A1 4/2013 Qiang
2017/0105154 A1* 4/2017 Li ......................... H04W 36/08

OTHER PUBLICATIONS

Huawei: "Pseudo-CR on Solution for SGW/PGW failure;" 3GPP draft; C4-110156; vol. CT WG4; Ljubljana; Jan. 21, 2011.
3rd Generation Partnership Project; Technical Specification Group Core Network and Terminals; Restoration procedures (Release 11); 3GPP TS 23.007; vol. CT WG4, V11.1.0; Mar. 8, 2012.
3rd Generation Partnership Project; Technical Specification Group Core Network and Terminals; Study of EPC Nodes Restoration; (Release 11); 3GPP draft; C4-120589; Feb. 15, 2012.
Ericsson: "EC-GSM—eDRX and TDMA FN Space Wrap Around". 3GPP TSG GERAN Ad Hoc#1 on FS_IoT_LC. Tdoc GPC150081. Feb. 2-5, 2014. Sofia Antipolis, France.
Ericsson LM: "EC-GSM—EC-SCH design, performance and mapping". 3GPP TSG GERAN1 Adhoc#1 on FS_IoT_LC. Tdoc GPC150064. Feb. 2-5, 2015. Sophia Antipolis, France.
Ericsson: "MS Energy Consumption Evaluation, PSM vs. eDRX". 3GPP TSG GERAN#64. Tdoc GP-140910. Nov. 17-21, 2014. San Francisco, USA.

* cited by examiner

SIGNALING OF CORE NETWORK RESTART TO WIRELESS DEVICES

CLAIM OF PRIORITY

This application claims the benefit of priority to U.S. Provisional Application Ser. No. 62/128,867, filed on Mar. 5, 2015, the entire contents of which are hereby incorporated herein by reference for all purposes.

TECHNICAL FIELD

The present disclosure relates generally to the wireless communications field and, more particularly, to a radio access network node and method for signaling to wireless devices that a network restart has occurred in a core network node which is associated with a pool of core network nodes. In addition, the present disclosure relates to a wireless device and method for receiving the signaling of a network restart from the radio access network node.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BCCH Broadcast Control Channel
BLER Block Error Rate
BSS Base Station Subsystem
BTS Base Transceiver Station
CC Coverage Class
CCCH Common Control Channel
CN Core Network
CRC Cyclic Redundancy Check
DRX Discontinuous Receive Cycle
EC-GSM Extended Coverage Global System for Mobile Communications
EC-PCH Extended Coverage Paging Channel
EC-SCH Extended Coverage Synchronization Channel
eDRX Extended Discontinuous Receive Cycle
eNB Evolved Node B
DSP Digital Signal Processor
EDGE Enhanced Data rates for GSM Evolution
EGPRS Enhanced General Packet Radio Service
FCCH Frequency Correction Channel
GSM Global System for Mobile Communications
GERAN GSM/EDGE Radio Access Network
GMSK Gaussian Minimum Phase Shift Keying
GP GERAN Plenary
GPC GERAN Plenary Cellular
GPRS General Packet Radio Service
HARQ Hybrid Automatic Repeat Request
HLR Home Location Register
IE Information Element
IMSI International Mobile Subscriber Identity
IoT Internet of Things
LTE Long-Term Evolution
M2M Machine-to-Machine
MBMS Multimedia Broadcast/Multicast Service
MME Mobility Management Entity
MS Mobile Station
MTC Machine Type Communications
NAS Non-Access Stratum
NB Node B
NRI Network Resource Identifier
PCH Paging Channel
PDP Packet Data Protocol
PDN Packet Data Network
PDTCH Packet Data Traffic Channel
PSM Power Saving Mode
P-TMSI Packet Temporary Mobile Subscriber Identity
RA Routing Area
RACH Random Access Channel
RAN Radio Access Network
RAU Routing Area Update
RNC Radio Network Controller
SCH Synchronization Channel
SGSN Serving GPRS Support Node
SI System Information
TAU Tracking Area Update
TDMA Time Division Multiple Access
TS Timeslot
TSC Timing Sequence Code
TSG Technical Specifications Group
UE User Equipment
VLR Visitor Location Register
WCDMA Wideband Code Division Multiple Access
WiMAX Worldwide Interoperability for Microwave Access
Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make blind transmissions. In this case, the wireless device may be referred to as a normal coverage wireless device. In contrast, a wireless device operating with radio interface performance attributes corresponding to an extended coverage (i.e., coverage class greater than 1) makes blind transmissions. In this case, the wireless device may be referred to as an extended coverage wireless device.
eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

Today it is common to use Serving General Packet Radio Service (GPRS) Support Nodes (SGSNs) in a pool. The benefit of pooling multiple SGSNs is that the service area is larger than the service area of one SGSN. The larger service area results in reduced inter-SGSN RA updates, and it reduces the Home Location Register (HLR) update traffic. Currently, when one of the SGSNs in a pool recovers from an error (e.g., a power failure where an SGSN restarts and therefore loses with respect to the registered wireless devices all knowledge of Packet Temporary Mobile Subscriber Identity (P-TMSI) to International Mobile Subscriber Identity (IMSI) associations), the SGSN may initiate individual paging for each of the currently registered wireless devices using the wireless device's IMSI. For example, the SGSN can request the IMSIs from the HLR and the Visitor Location Register (VLR) to understand which wireless devices are currently registered in the network. Then, with the knowledge of the IMSIs and the cell level Discontinuous Receive (DRX) cycle that is common to all of the wireless devices in the same cell, the SGSN can transmit paging indications to request the wireless devices (e.g., mobile stations (MSs)) to re-register to the network.

Upon reception of paging indications for GPRS services which use the wireless device's IMSI (instead of the wireless device's assigned P-TMSI), the wireless devices will locally deactivate any active packed data protocol (PDP) context(s) and Multimedia Broadcast/Multicast Service (MBMS) context(s), and locally detach from the GPRS. After performing the local detach, the wireless devices perform a GPRS attach or perform a GPRS attach procedure as well as activate PDP context(s) to replace any previously active PDP context(s). This will re-establish a Non-Access-Stratum (NAS) connection between the wireless devices and the core network (SGSNs), and thereby, the wireless devices will receive new P-TMSI assignments. Though this mechanism will work to notify all wireless devices served by a given core network node (SGSN) that the wireless devices need to perform a RAU procedure, it is undesirable because this mechanism will take a significant period of time in order to complete the notification process, during which there may be a substantial reduction in paging capacity due to the transmission of IMSI-based pages (i.e., a P-TMSI-based page requires 32 bits, whereas an IMSI-based page requires 64 bits). As discussed next, this IMSI-based paging mechanism is also a problem when wireless devices implement the new Extended DRX (eDRX) feature.

Extended DRX (eDRX) is a new feature under development that extends the paging cycles up to the hour range while the legacy paging cycle range is in the order of 1-10 seconds (see 3GPP TSG-GERAN Meeting #64 Tdoc GP-140910, entitled "MS Energy Consumption Evaluation, PSM vs. eDRX"—the contents of this document are hereby incorporated herein by reference for all purposes). In the legacy DRX operation, a DRX cycle, defined as the time between instances where the wireless device wakes up to monitor its Paging Channel (PCH), occurs on the order of once every few seconds and the same DRX cycle applies to all wireless devices in the same cell (i.e., the legacy DRX cycle lengths are cell specific). However, when the DRX cycle is extended, the eDRX cycle will be set per wireless device connection, and not per cell. Hence, an eDRX cycle will be determined for a specific wireless device suitable for the wireless device's service, e.g., a wireless device that needs to be contacted every 30 min to see that the wireless device is still operable.

However, when the core network (SGSN) requires a restart such as after a power failure, all information on the wireless device-specific eDRX cycles will be lost, and hence, the wireless devices will wake up according to their last registered eDRX cycle and monitor the PCH. In this case, the core network (SGSN) will no longer know when each wireless device wakes up, and therefore, all wireless devices will effectively become unreachable until the next registration event (e.g., until the next periodic registration event which may occur only once every 24 hours). Accordingly, there is a need to address these problems and other problems associated with a network restart in a pool of core network (CN) nodes.

SUMMARY

A radio access network node (e.g., BSS, eNodeB), a wireless device (e.g., MS) and various methods for addressing at least the aforementioned problems are described in the independent claims. Advantageous embodiments of the radio access network node (e.g., BSS, eNodeB), the wireless device (e.g., MS) and the various methods are further described in the dependent claims.

In one aspect, the present disclosure provides a RAN node configured to interact with a plurality of wireless devices. The RAN node comprises a processor and a memory that stores processor-executable instructions, wherein the processor interfaces with the memory to execute the processor-executable instructions, whereby the RAN node is operable to perform a signal operation, and a receive operation. In the signaling operation, the RAN node is operable to signal to the wireless devices an indication that a network restart has occurred in a CN node in a pool of CN nodes. In the receive operation, the RAN node is operable to receive from at least one of the wireless devices a re-registration message in response to the signaling of the indication that the network restart has occurred. An advantage of the RAN node implementing these operations is that this entails a faster and much more paging bandwidth-efficient technique for indicating a network restart event to multiple wireless devices when compared to the existing RAN node that individually informs each wireless device of a network restart event using IMSI-based paging.

In another aspect, the present disclosure provides a method in a RAN node configured to interact with a plurality of wireless devices. The method comprises a signaling step, and a receiving step. In the signaling step, the RAN node signals to the wireless devices an indication that a network restart has occurred in a CN node in a pool of CN nodes. In the receiving step, the RAN node receives from at least one of the wireless devices a re-registration message in response to the signaling of the indication that the network restart has occurred. An advantage of the RAN node implementing these steps is that this entails a faster and much more paging bandwidth-efficient technique for indicating a network restart event to multiple wireless devices when compared to the existing RAN node that individually informs each wireless device of a network restart event using IMSI-based paging.

In yet another aspect, the present disclosure provides a wireless device configured to interact with a RAN node. The wireless device comprises a processor and a memory that stores processor-executable instructions, wherein the processor interfaces with the memory to execute the processor-executable instructions, whereby the wireless device is operable to perform a receive operation, and a transmit operation. In the receive operation, the wireless device is operable to receive from the radio access network node an indication that a network restart has occurred in a core network node in a pool of core network nodes. In the transmit operation, the wireless device is operable to transmit to the radio access network node a re-registration message in response to the receipt of the indication that the network restart has occurred. An advantage of the wireless device implementing these operations is that this entails a faster and much more paging bandwidth-efficient technique for learning that a network restart event has occurred when compared to the existing mechanism where the wireless device would learn of a network restart event by IMSI-based paging.

In still yet another aspect, the present disclosure provides a method in a wireless device configured to interact with a RAN node. The method comprises a receiving step, and a transmitting step. In the receiving step, the wireless device receives from the radio access network node an indication that a network restart has occurred in a core network node in a pool of core network nodes. In the transmitting step, the wireless device transmits to the radio access network node a re-registration message in response to the receipt of the indication that the network restart has occurred. An advantage of the wireless device implementing these steps is that this entails a faster and much more paging bandwidth-efficient technique for learning that a network restart event has occurred when compared to the existing mechanism where the wireless device would learn of a network restart event by IMSI-based paging.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
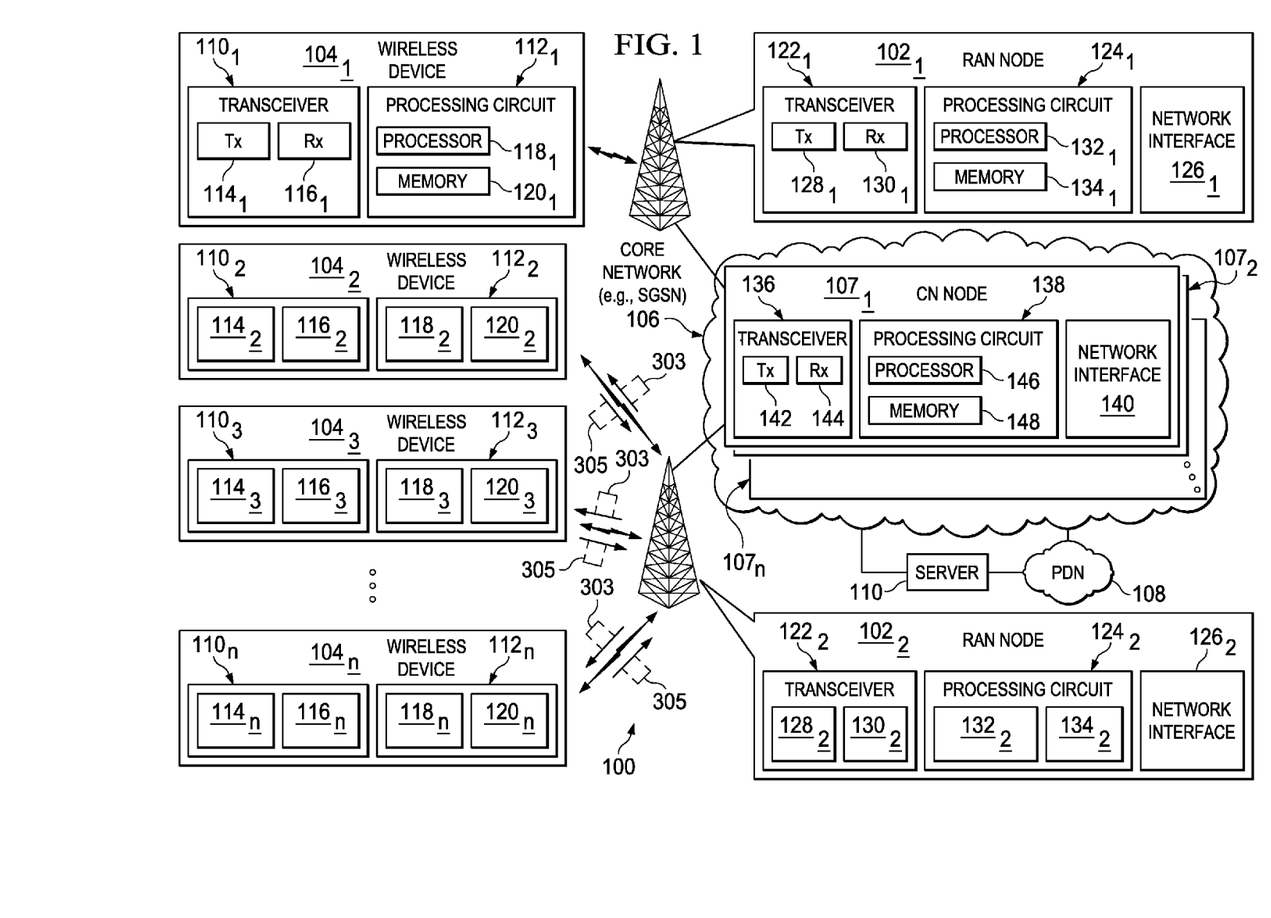
FIG. 1 is a diagram of an exemplary wireless communication network which includes multiple CN nodes, multiple RAN nodes, and multiple wireless devices which are configured in accordance with an embodiment of the present disclosure.

A discussion is provided first herein to describe an exemplary wireless communication network that includes multiple CN nodes (e.g., SGSNs, MMEs), multiple RAN nodes (e.g., BSSs, eNodeBs), and multiple wireless devices (e.g., MSs) in accordance with an embodiment of the present disclosure (see FIG. 1). Then, a discussion is provided to disclose different techniques that the RAN node can use to signal that a network restart has occurred and if desired other related information to the wireless devices in accordance with various embodiments of the present disclosure (see FIG. 2). Thereafter, a discussion is provided to explain the basic functionalities-configurations of the RAN node (e.g., BSSs, eNodeBs) and the wireless device (e.g., MS) in accordance with different embodiments of the present disclosure (see FIGS. 3-6).

Exemplary Wireless Communication Network 100

Referring to FIG. 1, there is illustrated an exemplary wireless communication network 100 in accordance with the present disclosure. The wireless communication network 100 includes a core network 106 (which comprises a pool of CN nodes $107_1$, $107_2$ . . . $107_n$) and multiple RAN nodes $102_1$ and $102_2$ (only two shown) which interface with multiple wireless devices $104_1$, $104_2$, $104_3$ . . . $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (wireless access nodes—only two shown) which provide network access to the wireless devices $104_1$, $104_2$, $104_3$ . . . $104_n$. In this example, the RAN node $102_1$ is providing network access to wireless device $104_1$ while the RAN node $102_2$ is providing network access to wireless devices $104_2$, $104_3$ . . . $104_n$. The RAN nodes $102_1$ and $102_2$ are connected to the core network 106 (e.g., SGSN core network 106) and, in particular, to the pool of CN nodes $107_1$, $107_2$ . . . $107_n$ (e.g., SGSNs $107_1$, $107_2$ . . . $107_n$). The core network 106 is connected to an external packet data network (PDN) 108, such as the Internet, and a server 110 (only one shown). The wireless devices $104_1$, $104_2$, $104_3$ . . . $104_n$ may communicate with one or more servers 110 (only one shown) connected to the core network 106 and/or the PDN 108.

The wireless devices $104_1, 104_2, 104_3 \ldots 104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1, 104_2, 104_3 \ldots 104_n$ may include a transceiver circuit $110_1, 110_2, 110_3 \ldots 110_n$ for communicating with the RAN nodes $102_1$ and $102_2$, and a processing circuit $112_1, 112_2, 112_3 \ldots 112_n$ for processing signals transmitted from and received by the transceiver circuit $110_1, 110_2, 110_3 \ldots 110_n$ and for controlling the operation of the corresponding wireless device $104_1, 104_2, 104_3 \ldots 104_n$. The transceiver circuit $110_1, 110_2, 110_3 \ldots 110_n$ may include a transmitter $114_1, 114_2, 114_3 \ldots 114_n$ and a receiver $116_1, 116_2, 116_3 \ldots 116_n$, which may operate according to any standard, e.g., the GSM/EDGE standard. The processing circuit $112_1, 112_2, 112_3 \ldots 112_n$ may include a processor $118_1, 118_2, 118_3 \ldots 118_n$ and a memory $120_1, 2102, 120_3 \ldots 120_n$ for storing program code for controlling the operation of the corresponding wireless device $104_1, 104_2, 104_3 \ldots 104_n$. The program code may include code for performing the procedures as described hereinafter with respect to FIG. 5.

Each RAN node $102_1$ and $102_2$ (wireless access node $102_1$ and $102_2$) may include a transceiver circuit $122_1$ and $122_2$ for communicating with wireless devices $104_1, 104_2, 104_3 \ldots 104_n$ a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures as described hereinafter with respect to FIG. 3.

Each CN node $107_1, 107_2 \ldots 107_n$ (e.g., SGSN $107_1, 107_2 \ldots 107_n$, MME $107_1, 107_2 \ldots 107_n$) may include a transceiver circuit 136 for communicating with the RAN nodes $102_1$ and $102_2$, a processing circuit 138 for processing signals transmitted from and received by the transceiver circuit 136 and for controlling the operation of the CN node $107_1, 107_2 \ldots 107_n$, and a network interface 140 for communicating with the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node $107_1, 107_2 \ldots 107_n$. The program code may include code for performing the procedures as described hereinafter.

Signaling Core Network Restart

A discussion is provided hereinafter to describe various techniques that the RAN node $102_2$ (for example) can use to signal to the wireless devices $104_2, 104_3 \ldots 104_n$ (for example) that a network restart has occurred and optionally also signal which CN node $107_1, 107_2 \ldots 107_n$ in the pool area has been restarted. Some of these techniques are as follows:

I. Add bits in one or more messages to indicate that the network restart has occurred and optionally which CN node $107_1, 107_2 \ldots 107_n$ in the pool area has been restarted, where the one or more of the messages are (i) mapped onto channel(s) which the wireless devices $104_2, 104_3 \ldots 104_n$ regularly (periodically) wake up to monitor prior to attempting to receive pages for reading the wireless device's paging group, or (ii) mapped onto channel(s) that is/are monitored regularly (periodically) by the wireless devices $104_2, 104_3 \ldots 104_n$ while in idle mode. Such a message could, for example, be conveyed as one or more of the following: (1) over a Synchronization Channel (SCH), (2) as one or more of the Broadcast Channel System Information (SI) messages, and (3) over the Common Control Channels (CCCHs), such as the Access Grant Channel (AGCH) and the Paging Channel (PCH).

II. An 'in-band' signaling in existing channels. 'In-band' in this regard refers to the use of procedures that result in the addition of supplemental information bits in conjunction with a message transfer without changing the content of the message itself, where the supplemental information bits indicate that a network restart has occurred and optionally which CN node $107_1, 107_2 \ldots 107_n$ in the pool area has been restarted. This 'in-band' signaling can, for example, be realized by having the RAN node $102_2$ use a so-called "super channel" wherein existing channel(s) are overlayed with a low bit rate channel (i.e., a supplemental information channel) which indicates that a network restart has occurred and optionally which CN node $107_1, 107_2 \ldots 107_n$ in the pool area has been restarted by using (1) different modulation symbol rotation or modulation index, or (2) using a bit-wise modulo 2 operation with a known bit pattern in the message, for example, the message-specific Cyclic Redundancy Check (CRC) bits. A more detailed discussion is provided below with respect to FIG. 2 about the super channel and how different modulation symbol rotations or modulation indexes can be used for signaling to the wireless devices $104_2, 104_3 \ldots 104_n$ that a network restart has occurred and optionally which CN node $107_1, 107_2 \ldots 107_n$ in the pool area has been restarted. The basic technical features of the super channel were first discussed in the co-assigned U.S. Provisional Application Ser. No. 62/023,453, filed Jul. 11, 2014, and entitled "Transmitter, Receiver and Methods Therein". The contents of this document are hereby incorporated herein by reference for all purposes.

Furthermore, the network (e.g., the RAN node $102_2$) can provide the wireless devices $104_2, 104_3 \ldots 104_n$ with information indicating the longest-used paging cycle in the cell to allow the wireless devices $104_2, 104_3 \ldots 104_n$ to understand that a re-registration is not required every time that an indication that a network restart has occurred is signaled during a time period spanned by the identified longest used paging cycle. This information may be provided either:

1. By the Base Station Subsystem (BSS)/Base Transceiver Station (BTS), Radio Network Controller (RNC)/Node B (NB)/Evolved Node B (eNB), in one of the SI messages; or 2. By the SGSN/Mobility Management Entity (MME) in one of the downlink NAS messages, e.g., GPRS Attach Accept, RAU Accept.

An alternative technique would be to have a predefined maximum duration wherein the network restart indication is in effect. That is, once a network restart is first signaled, the network restart notification remains in effect for this predefined maximum duration. As such, upon first detecting that a network restart has occurred, the wireless device $104_2$ (for example) will only perform a single re-registration while the network restart notification remains in effect (e.g., enabled). Once the network restart notification is determined to no longer be in effect (e.g., disabled), the wireless device $104_2$ (for example) shall once again be subject to detecting another network restart notification and, therefore, responding by performing another re-registration. As an example, with EC-GSM where it is proposed to set the maximum eDRX cycle to 52 minutes, the core network restart indication could have a predefined maximum duration of 1 hour (the maximum eDRX cycle length plus eight minutes can be used to keep signaling of the predefined maximum duration simple). For general details about EC-GSM, reference is made to 3GPP TSG GERAN Adhoc#1 on FS_IoT_LC Tdoc GPC150081, entitled "EC-GSM—eDRX and TDMA FN Space Wrap Around", dated 2-5 Feb. 2015. The contents of this document are hereby incorporated herein by reference for all purposes.

In the following discussion several exemplary techniques are described which the RAN node $102_2$ (for example) could use for signaling an indication 303 to the wireless devices $104_2, 104_3 \ldots 104_n$ (for example) that a network restart has occurred and optionally also signal which CN node $107_1, 107_2 \ldots 107_n$ in the pool area has been restarted and/or the longest used paging cycle. The following detailed discussion is based on a scenario where the RAN node $102_2$ (for example) signals the core network restart etc . . . to wireless devices $104_2, 104_3 \ldots 104_n$ (for example) operating in an eDRX mode in an EC-GSM system 100. Further, the techniques described hereinafter for signaling that a network restart has occurred etc . . . depend on the operation of the wireless devices $104_2, 104_3 \ldots 104_n$ (for example), e.g., if the signaling is to a normal coverage wireless device $104_2$ (for example) or to an extended coverage wireless device $104_3$ (for example). Recall: the normal coverage wireless device $104_2$ (for example) is operating with radio interface performance attributes corresponding to the reference coverage which is considered to be in the best coverage class (i.e., coverage class 1) and therefore does not make blind transmissions. The extended coverage wireless device $104_3$ (for example) is operating with radio interface performance attributes corresponding to an extended coverage (i.e., coverage class greater than 1) and therefore needs to make blind transmissions. In the following detailed discussion, only the applicability to GSM is described. However, the described principles and techniques would apply to any technology where paging-based reachability is supported or where a wireless device needs to be notified that there has been a core network error resulting in a loss of device-specific information such that the wireless devices will have to perform a re-registration.

Signaling of Core Network Restart to Normal Coverage Wireless Device $104_2$ (For Example)

The normal coverage wireless device $104_2$ (for example) uses timeslot zero (TS0) for reading SI, downlink Common Control Channels (CCCHs), such as the AGCH and PCH, as well as for reading the Frequency Correction Channel (FCCH) and the Synchronization Channel (SCH). The latter channels (i.e., FCCH and SCH) are used by the wireless device $104_2$ to synchronize to the network 100 before making a network access and/or reading a page. In the present disclosure, the normal coverage wireless device $104_2$ that operates in eDRX mode and that has been in a power saving state for a while, e.g., 5 minutes, may have drifted both in frequency and time and thus needs to re-synchronize itself to the network 100 in order to successfully read a page.

In one embodiment, the normal coverage wireless device $104_2$ would, while synchronizing itself with the network 100, also acquire information about a core network 106 namely that a network restart has occurred and optionally which CN node $107_1, 107_2 \ldots 107_n$ in the pool area has been restarted and/or the longest used paging cycle. The signaling of this information by the RAN node $102_2$ and the wireless device $104_2$ acquiring this information may be achieved by the use of the so-called super channel solution (e.g., briefly discussed above) which provides a low bit rate channel (e.g., in-band channel, supplement information channel) on top of at least one existing channel without impacting legacy wireless devices. The basic idea is to use, for example, relative changes in the phase of the burst (i.e., modulation angle) as a means to carry information (e.g., a network restart has occurred, the particular CN node $107_1, 107_2 \ldots 107_n$ in the pool area that has been restarted, the longest used paging cycle). Since the wireless device $104_2$ needs to synchronize itself to the network 100 it needs to read the FCCH and SCH burst on TS0, where the phase information of these two bursts and the immediately following bursts are ideal for conveying additional information (e.g., a network restart has occurred, the particular CN node $107_1, 107_2 \ldots 107_n$ in the pool area that has been restarted, the longest used paging cycle) to the wireless device $104_2$ in eDRX mode. It is to be noted that, since all bursts sent on TS0 in GSM need to be transmitted with full power, using Gaussian Minimum Phase Shift Keying (GMSK) modulation, and using the same Training Sequence Code (TSC) signal (e.g., applying for the Broadcast Control Channel (BCCH), AGCH, and PCH), it is suitable to be used as a carrier for the super channel (i.e., the supplemental information channel) since it will reach all the wireless devices $104_2, 104_3 \ldots 104_n$ (for example) in the cell.

Figure 2:
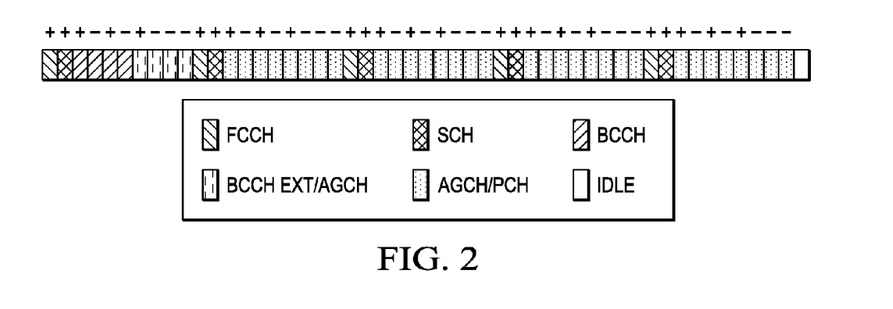
FIG. 2 is an illustration of a super channel technique where the RAN node uses a modulation angle to achieve a low bit rate channel (supplemental information channel) on top of existing channels in order to signal that a network restart has occurred and possibly other related information to wireless devices in accordance with an embodiment of the present disclosure.

Referring to FIG. 2, there is a diagram illustrating an example where the RAN node $102_2$ (for example) can provide a low bit rate channel (i.e., the supplemental information channel) through the use of different phase angles (i.e., illustrated by "+" and "−"signs, corresponding to 0 degree or 180 degree phase shift, for example) on the first two bursts on the FCCH and SCH, and the eight additional bursts of TS0 occurring immediately thereafter. In this case, within any given 51-multiframe, 5 sets of these 10 consecutive bursts of TS0 (each starting with a pair of FCCH and SCH bursts on TS0) will be supported. The first set of these 10 bursts occurring in TS0 of the first 10 TDMA frames within a 51-multiframe occur on the first pair of FCCH and SCH bursts in the 51-multiframe followed by 4 BCCH bursts and 4 BCCH EXT/AGCH bursts which can be used to signal that a network restart has occurred and other related information (see above) to the wireless device $104_2$ (for example) in accordance with an embodiment of the present disclosure. The "+" and "−" phases illustrated may, e.g., correspond to "1" and "0", respectively, and thus, in this example of the first 10 bursts within a 51-multiframe, the signal would be "1110101000" which can indicate to the wireless device $104_2$ that a network restart has occurred and other related information as discussed in more detail next. In this example, the most significant bit (i.e., the first bit position out of the total ten bits "1110101000") can be used as a phase reference to which bit positions 2-10 change their phases. For example, to signal a core network restart, the second bit could use a phase difference of 180 degrees relative to the reference bit (e.g., first bit in FIG. 2), while no phase change relative to the reference bit is used if there is no core network restart. The other 8 bits may be used to indicate which CN node $107_1, 107_2 \ldots 107_n$ in the pool area has been restarted, the longest used paging cycle, and/or a SI version/vintage counter. The advantage of including a SI version/vintage counter would be that, during the synchronization process, the wireless device $104_2$ (for example) would also be able to determine if there is a need to re-acquire any of the SI messages. Note: the previously described signaling techniques that do not involve the use of the "super channel" can if desired also signal the SI version/vintage counter.

In another embodiment, these 8 bits can carry the Network Resource Identifier (NRI) or parts of the NRI bitmap of the CN node $107_1, 107_2 \ldots 107_n$ that has restarted. The wireless device $104_2$ (for example) can then compare this NRI value with the NRI portion of their P-TMSI to determine if they need to perform a re-registration.

In yet another embodiment, some of these 8 bits can be used to convey the SI version/vintage counter without the need to also carry the identity of the particular CN node $107_1, 107_2 \ldots 107_n$ in the pool area that has been restarted. In this case, when the wireless device $104_2$ (for example) detects that the value of the SI version/vintage counter has changed, the wireless device $104_2$ thereby knows it needs to re-acquire SI. The SI can include new information that indicates when one or more CN nodes $107_1, 107_2 \ldots 107_n$ have experienced a restart and the identities of the specific CN nodes $107_1, 107_2 \ldots 107_n$ (e.g., a list of NRIs) which has experienced a restart. In this example, the wireless device $104_2$ plus other normal coverage wireless devices in possession of a P-TMSI whose NRI portion matches one of the NRIs in the SI's information will determine that they need to perform the RAU procedure (re-registration procedure) to acquire a new P-TMSI. It is to be noted that the NRI of a CN node $107_1, 107_2 \ldots 107_n$ is expected to remain the same whenever that CN node $107_1, 107_2 \ldots 107_n$ experiences a restart event.

In another embodiment, 5 of these 8 bits are used to signal a pool unique identity for the CN node $107_1, 107_2 \ldots 107_n$ that has restarted (e.g., 5 bits), while the other 3 bits are used to identify a SI version/vintage counter. The wireless device $104_2$ (for example) thereby detects that the signaled pool unique identity corresponds to the CN node $107_1$ (for example) that it last registered with and therefore it performs a new NAS registration procedure (after first re-acquiring system information if required according to the SI version/vintage counter). Note that when any given NAS registration procedure is performed the CN node $107_1$ (for example) responsible for handling the wireless device $104_2$ (for example) may include the pool unique identity in a new Information Element (IE) in any of the downlink NAS messages, such as the RAU accept message, for example.

The aforementioned exemplary scheme shown in FIG. 2 is just one possible realization of the super channel. In another embodiment, in order to be able to handle multiple core network restarts within the duration of the longest supported paging cycle in the cell, more than one bit may be needed to signal a core network restart. In yet another embodiment that does not entail the supper channel, the messages on the AGCH and the PCH are updated to carry an indication that a network restart has taken place. For instance, the indication that a restart has taken place can be provided in a completely new IE or by reusing an unused code point "11" in the Page Mode IE, for example. The identity of the impacted CN node(s) $107_1, 107_2 \ldots 107_n$ may be included in a new IE in the AGCH/PCH messages or as a new IE in an existing or a new SI message. A wireless device $104_2$ (for example) in eDRX mode can then detect that the CN node $107_1, 107_2 \ldots 107_n$ to which it is registered has restarted and then can proceed, as when a legacy device receives a page with IMSI, i.e., by sending a re-registration message to the RAN node $102_2$.

Signaling of Core Network Restart to Extended Coverage Wireless Device $104_3$ (For Example)

The extended coverage wireless device $104_3$ (for example) will read SI as well as the synchronization channels on timeslot 1 (TS1). The redesign of the SCH, where the complete set of EC-SCH blocks are transmitted over the first seven Time Division Multiple Access (TDMA) frames in two consecutive 51-multiframes, results in 6 spare bits in the EC-SCH content. These 6 spare bits are realized by re-organizing the 25 bit payload space of the legacy SCH to instead provide a reduced amount of TDMA frame number information which is sufficient for wireless devices $104_1, 104_2, 104_3 \ldots 104_n$ that operate using extended coverage. The extended coverage wireless devices $104_1, 104_2, 104_3 \ldots 104_n$ will commonly acquire the EC-SCH which can serve as a convenient logical channel for indicating when a network restart has occurred using one or more of these 6 spare bits. In fact, it has already been proposed to use some of these 6 bits to convey overload control information and BCCH_CHANGE_MARK information. This proposal was discussed, for example, in 3GPP TSG GERAN Adhoc#1 on FS_IoT_LC Tdoc GPC150064, entitled "EC-GSM—EC-SCH design, performance and mapping" dated 2-5 Feb. 2015—the contents of which are hereby incorporated herein by reference for all purposes). In one embodiment, it is proposed to use one of these spare bits to signal that a network restart has occurred to the wireless device $104_3$ (for example), followed by having the wireless device $104_3$ read one or more SI messages to determine the identity (e.g., NRI or pool unique identity) of the CN node $107_1, 107_2 \ldots 107_n$ that has restarted. In another embodiment, the super channel may be used, similar to the aforementioned normal coverage scenario for indicating both that a network restart has occurred as well as which CN node $107_1, 107_2 \ldots 107_n$ has been restarted. In extended coverage, redundancy might need to be added to the coding of the super channel in order to reach the wireless devices currently in extended coverage.

In another embodiment, the SI version/vintage counter, i.e., the indication to the wireless device $104_3$ (for example) that the SI has changed, may be used to communicate the core network restart. For instance, if a change in SI version/vintage counter occurs, then the wireless device $104_3$ will reacquire the SI, and by that, read a flag in the SI that indicates that a core network restart has occurred as well as the identity of the CN node $107_1, 107_2 \ldots 107_n$ that has restarted.

In yet another embodiment, a bit-wise modulo 2 operation may be performed on a known part of a message monitored by the wireless device $104_3$ (for example). This known part can, for example, be the CRC bits of the EC-SCH message, and a bit would be obtained in the decoding process of the message. If the bit indicates that a restart has occurred, then the wireless device $104_3$ (for example) would re-acquire the SI, and by that, read a flag in the SI that indicates that a core network restart has occurred as well as the identity of the CN node $107_1, 107_2 \ldots 107_n$ that has restarted.

In yet another embodiment, the signaling of a core network restart may be performed using a negative modulation index for GMSK-modulated bursts, the basics of this signaling scheme are discussed, for example, in U.S. Provisional Application No. 62/039,489, filed Aug. 20, 2014, entitled "Radio Network Node, Wireless Device and Methods Thereof Using GMSK Modulation Applying Negative Modulation Index" (the contents of this document are hereby incorporated herein by reference for all purposes). In this case, the wireless device $104_3$ (for example) detects which of two modulation indices is used where one indicates that a core network restart has not occurred, and the other one indicates that a core network restart has occurred.

In all these embodiments, an effective result is that a wireless device $104_3$ (for example) in extended coverage and in eDRX mode would detect that the CN node $107_1$, $107_2 \ldots 107_n$, to which the wireless device $104_3$ is registered, has restarted, and therefore, the wireless device $104_3$ would proceed as when a legacy wireless device receives a page with IMSI, i.e., the wireless device $104_3$ would know it needed to perform a re-registration.

Signaling of Longest-Used Paging Cycle in the Cell

In order for the network 100 to be able to signal to all wireless devices $104_2, 104_3 \ldots 104_n$ (for example) in the cell that a network restart has occurred, the core network restart signaling could as discussed above be enabled for at least the duration of the longest paging cycle that is in use in the cell. As an example, assume the longest paging cycle in use in the cell is 30 minutes. This would mean that a wireless device $104_2$ (for example) with a 5 minute paging cycle duration would detect that a core network restart has occurred up to 6 times within a 30 minute window and, if no other information was available, the wireless device $140_2$ would perform a re-registration 6 times when re-registering once would have been sufficient.

In order to allow a wireless device $104_2$ (for example) to determine whether another re-registration is needed after initially detecting a network restart indication and registering, it is proposed to signal in addition to the network restart information an indication indicating the longest-used paging cycle in the cell if the maximum specified value is not already used in the cell. With this additional information the wireless device $104_2$ (for example) that initially detects a network restart indication and therefore registers will ignore any additional network restart indications detected thereafter for a time period indicated by the longest-used paging cycle in the cell. If the maximum specified value for the longest paging cycle that can be used in the cell is assumed to be fixed (i.e., it will never be changed in a future release of the specifications), then the wireless device $104_2$ could default to using the longest paging cycle supported by the specifications to determine the maximum-used paging cycle in the cell and would therefore not need to be explicitly signaled the longest-used paging cycle in the cell. With this assumption the wireless device $104_2$ would implicitly know that the signaling of a core network restart will remain in effect for a time period determined using the longest paging cycle supported by the specifications (i.e., a predefined maximum duration). In summary, if the wireless device $104_2$ is explicitly signaled the longest-used paging cycle used for the cell then that is what it uses to determine the time period for which it ignores any additional network restart indications detected after first detecting an initial restart indication and registering. For the case where the longest-used paging cycle used for the cell is not explicitly signaled the wireless device $104_2$ can default to using the maximum paging cycle supported by the specifications as the maximum-used paging cycle in the cell and therefore use this default value to determine a predefined maximum duration (e.g., 1 hour) for which it ignores any additional network restart indications detected after first detecting an initial restart indication and registering.

Once the network restart notification is determined to not be in effect (i.e., disabled), the wireless device $104_2$ shall once again be subject to detecting another network restart notification and therefore responding by performing another re-registration. As an example, with EC-GSM where it is proposed to set the maximum eDRX cycle to 52 minutes (e.g., as discussed in the aforementioned GPC150081), a predefined maximum duration for the core network restart indication could be 1 hour (the maximum eDRX cycle length plus eight minutes can be used to keep signaling of the predefined maximum duration simple).

It is proposed, but not limited, to either broadcast the maximum-used paging cycle in the cell in the SI or to provide the wireless device $104_2$ (for example) with this information whenever the wireless device $104_2$ performs an attach to the network 100 or to not signal this information and thereby allow the wireless device $104_2$ (for example) to default to using the longest paging cycle supported by the specifications as the maximum-used paging cycle in the cell. Alternatively, this information may be sent from the CN node $107_1, 107_2 \ldots 107_n$ (e.g., SGSN $107_1, 107_2 \ldots 107_n$) to the wireless device $104_2$ in any of the downlink NAS messages, such as GPRS Attach Accept, Routing Area Update Accept, or Activate PDP Context Accept, for example. The wireless device $104_2$ can then determine the predefined maximum duration (e.g., from the broadcast/ provided maximum-used paging cycle or from the default longest paging cycle supported by the specifications) so that it may send only one re-registration message during this determined predefined maximum duration.

Basic Functionalities-Configurations of RAN Node $102_2$ and Wireless Device $104_2$ (For Example)

Figure 3:
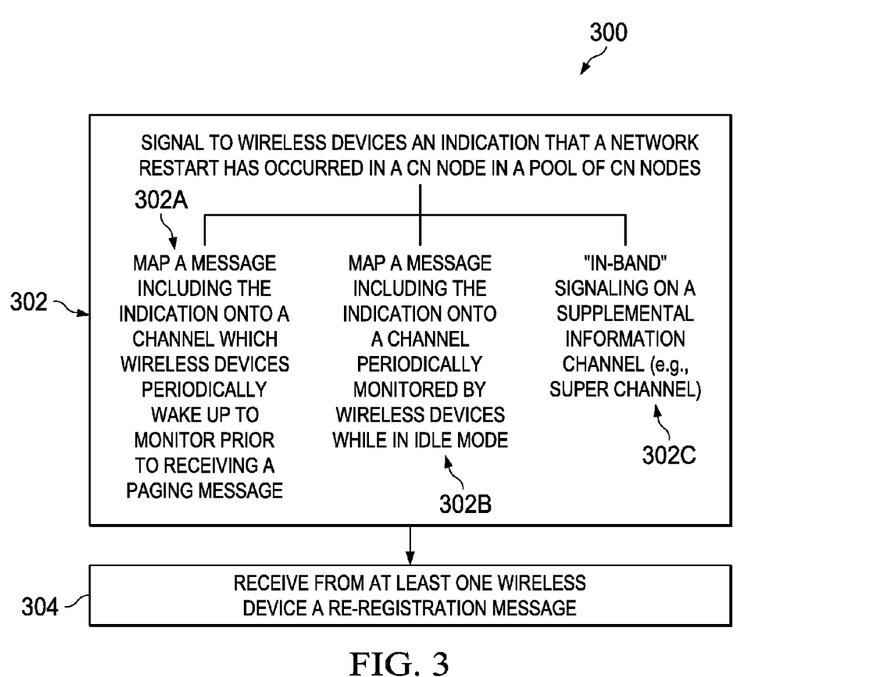
FIG. 3 is a flowchart of a method implemented in the RAN node in accordance with an embodiment of the present disclosure.

Referring to FIG. 3, there is a flowchart of a method 300 implemented in the RAN node $102_2$ (e.g., BSS $102_2$, eNodeB $102_2$) in accordance with an embodiment of the present disclosure. At step 302, the RAN node $102_2$ signals to the wireless devices $104_2, 104_3 \ldots 104_n$ (for example) an indication 303 that a network restart has occurred in a CN node $107_1$ (for example) in a pool of CN nodes $107_1$, $107_2 \ldots 107_n$ (note: the indication 303 does not necessarily have to indicate the particular CN $107_1$ (for example) that has been restarted but instead just has to indicate that a CN node has been restarted). As discussed above, there are various exemplary ways that the RAN node $102_2$ can perform step 302 some of which are as follows:

(1) The RAN node $102_2$ is operable to signal the indication 303 by mapping a message including the indication 303 onto a channel (e.g., BCCH, SCH), which each of the wireless devices $104_2, 104_3 \ldots 104_n$ periodically wakes up to monitor prior to attempting to receive a paging message, wherein this periodicity of monitoring the channel may be higher (more frequent) than the periodicity that each of the wireless device $104_2$, $104_3 \ldots 104_n$ uses for monitoring paging messages (see step $302a$).

(2) The RAN node $102_2$ is operable to signal the indication 303 by mapping a message including the indication 303 onto a channel (e.g., BCCH, SCH), which is periodically monitored by each of the wireless devices $104_2$, $104_3 \ldots 104_n$ while in idle mode, wherein the periodicity of monitoring the channel may be higher (more frequent) than the periodicity that each of the wireless devices $104_2$, $104_3 \ldots 104_n$ uses for monitoring paging messages (see step $302b$).

(3) The RAN node $102_2$ is operable to signal the indication 303 by 'in-band' signaling that includes signaling the indication 303 in conjunction with a transfer of a message without changing a content of the message. In one example, the RAN node $102_2$ is operable to perform the 'in-band' signaling by overlaying the at least one channel (e.g., the SCH or EC-SCH), which is periodically monitored by the wireless devices $104_2$, $104_3 \ldots 104_n$ with a supplemental information channel (e.g., the super channel, low bit rate channel) that signals the indication 303 (the network restart information etc . . . ) by (1) using a different modulation symbol rotation or modulation index, or (2) using a bit-wise modulo 2 operation with a known bit pattern (step $302c$).

The indication 303 in addition to indicating that a network restart has occurred could also indicate at least one the following (for example): (1) identify the particular CN node $107_1$ (for example) that has been restarted; (2) identify a longest used paging cycle in a cell to indicate to the wireless device $104_2$ (for example) that a re-registration is not required every time that an indication that a network restart has occurred is signaled during a time period spanned by the longest used paging cycle; and (3) identify a SI version or SI vintage counter.

At step 304, the RAN node $102_2$ receives from at least one of the wireless devices $104_2$, $104_3 \ldots 104n$ (e.g., all or a subset of the wireless devices $104_2$, $104_3 \ldots 104n$) a re-registration message 305 (e.g., RAU Request message 305) in response to the signaling of the indication that the network restart has occurred. After step 304, the RAN node $102_2$ can operate to forward the re-registration message 305 to the appropriate CN node $107_1$ (for example). Upon receiving the re-registration message 305, the CN node $107_1$ completes the RAU procedure along with any additional NAS signaling procedures (e.g., PDP Context Activation) with the re-registering wireless device $104_2$ (for example) thereby resulting in the CN node $107_1$ having re-acquired all necessary information for that wireless device $104_2$ (for example) subsequent to the CN node $107_1$ experiencing a restart condition. The RAN node $102_2$ by operating in this manner results in a faster and much more paging bandwidth-efficient scheme to address a network restart when compared to the existing mechanism where the traditional RAN node individually informs each mobile station of a network restart event using IMSI-based paging. The other RAN node $102_1$ can also be configured in a similar manner to perform method 300.

Figure 4:
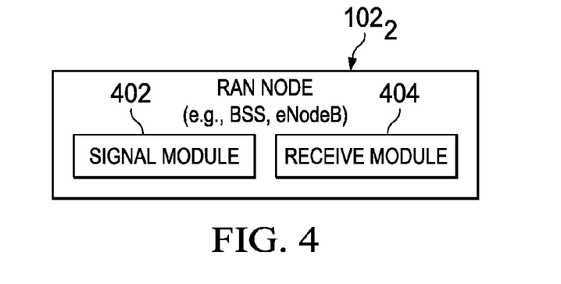
FIG. 4 is a block diagram illustrating an exemplary structure of the RAN node configured in accordance with an embodiment of the present disclosure.

Referring to FIG. 4, there is a block diagram illustrating structures of an exemplary RAN node $102_2$ (for example) configured in accordance with an embodiment of the present disclosure. In one embodiment, the RAN node $102_2$ may comprise a signal module 402, and a receive module 404. The signal module 402 is configured to signal to the wireless devices $104_2$, $104_3 \ldots 104_n$ (for example) an indication 303 that a network restart has occurred in a CN node $107_1$ (for example) in a pool of CN nodes $107_1$, $107_2 \ldots 107_n$ (note: the indication 303 does not necessarily have to indicate the particular CN node $107_1$ (for example) that has been restarted but instead just has to indicate that a CN node has been restarted). There are various exemplary ways that the signal module 402 can be configured to signal to the wireless devices $104_2$, $104_3 \ldots 104_n$ the indication 303 that the network restart has occurred in a CN node $107_1$ (for example) some of which are as follows:

(1) The signal module 402 is configured to signal the indication 303 by mapping a message including the indication 303 onto a channel (e.g., BCCH, SCH), which each of the wireless devices $104_2$, $104_3 \ldots 104_n$ periodically wakes up to monitor prior to attempting to receive a paging message, wherein this periodicity of monitoring the channel may be higher (more frequent) than the periodicity that each of the wireless devices $104_2$, $104_3 \ldots 104_n$ uses for monitoring paging messages (see step $302a$).

(2) The signal module 402 is configured to signal the indication 303 by mapping a message including the indication onto a channel (e.g., BCCH, SCH), which is periodically monitored by each of the wireless devices $104_2$, $104_3 \ldots 104_n$ while in idle mode, wherein the periodicity of monitoring the channel may be higher (more frequent) than the periodicity that each of the wireless devices $104_2$, $104_3 \ldots 104_n$ uses for monitoring paging messages (see step $302b$).

(3) The signal module 402 is configured to signal the indication 303 by 'in-band' signaling that includes signaling the indication 303 in conjunction with a transfer of a message without changing a content of the message. In one example, the signal module 402 is configured to perform the 'in-band' signaling by overlaying the at least one channel (e.g., SCH or EC-SCH), which is periodically monitored by the wireless devices $104_2$, $104_3 \ldots 104_n$ with a supplemental information channel (e.g., the super channel, low bit rate channel) that signals the indication 303 (the network restart information etc . . . ) by (1) using a different modulation symbol rotation or modulation index, or (2) using a bit-wise modulo 2 operation with a known bit pattern (see step $302c$).

The indication 303 in addition to indicating that a network restart has occurred could also indicate at least one the following (for example): (1) identify the particular CN node $107_1$ (for example) that has been restarted; (2) identify a longest used paging cycle in a cell to indicate to the wireless device $104_2$ (for example) that a re-registration is not required every time that an indication that a network restart has occurred is signaled during a time period spanned by the longest used paging cycle; and (3) identify a SI version or SI vintage counter.

The receive module 404 is configured to receive from at least one of the wireless devices $104_2$, $104_3 \ldots 104_n$ (e.g., all or a subset of the wireless devices $104_2$, $104_3 \ldots 104n$) a re-registration message 305 (e.g., RAU Request message 305) in response to the signaling of the indication that the network restart has occurred. The RAN node $102_2$ can include one or more additional modules which upon receipt of the re-registration messages 305 can be configured to forward the re-registration message 305 to the appropriate CN node $107_1$ (for example). Upon receiving the re-registration message 305, the CN node $107_1$ completes the RAU procedure along with any additional NAS signaling procedures (e.g., PDP Context Activation) with the re-registering wireless device $104_2$ (for example) thereby resulting in the CN node $107_1$ having re-acquired all necessary information for that wireless device $104_2$ (for example) subsequent to the CN node $107_1$ experiencing a restart condition. The RAN node $102_2$ is specially configured to implement a faster and much more paging bandwidth-efficient scheme to address a network restart when compared to the existing mechanism where the traditional RAN node individually informs each mobile station of a network restart event using IMSI-based paging. The other RAN node $102_1$ can also be configured in a similar manner with the illustrated structures (or similar structures) of the exemplary RAN node $102_2$ of FIG. 4. Further, it should be noted that the RAN node $102_2$ may also include other components, modules or structures which are well-known, but for clarity, only the components, modules or structures needed to describe the features of the present disclosure are described herein.

As those skilled in the art will appreciate, the above-described modules 402 and 404 of the RAN node $102_2$ (e.g., BSS $102_2$, eNodeB $102_2$) may be implemented separately as suitable dedicated circuits. Further, the modules 402 and 404 can also be implemented using any number of dedicated circuits through functional combination or separation. In some embodiments, the modules 402 and 404 may be even combined in a single application specific integrated circuit (ASIC). As an alternative software-based implementation, the RAN node $102_2$ may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ (e.g., BSS $102_2$, eNodeB $102_2$) to perform the steps of the above-described method 300. It should be appreciated that the other RAN nodes $102_1$ (for example) can also be configured in a similar manner as the RAN node $102_2$ to perform method 300.

Figure 5:
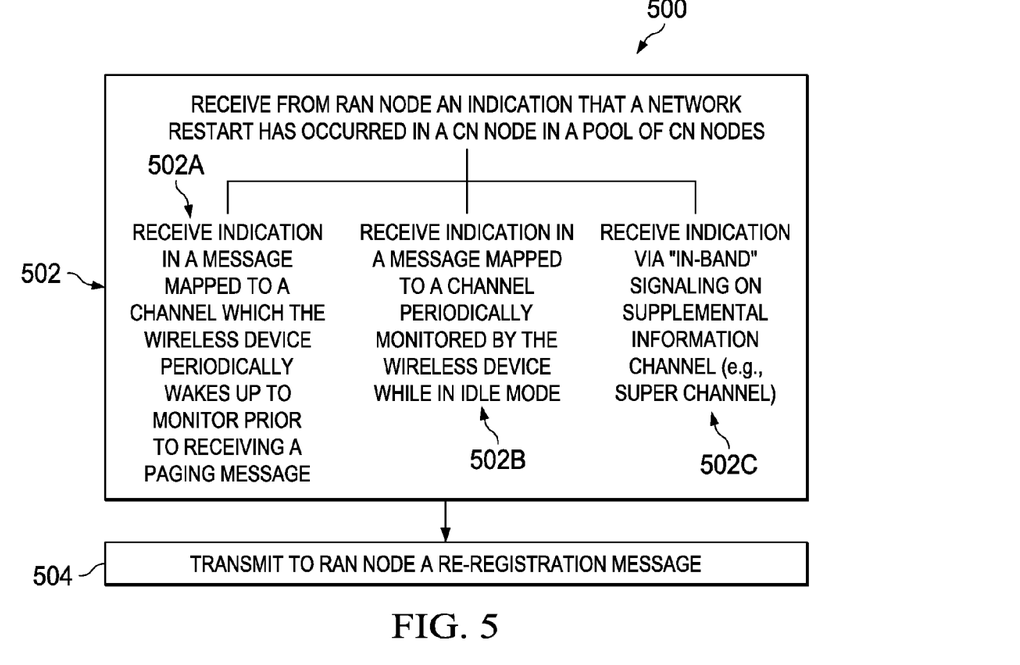
FIG. 5 is a flowchart of a method implemented in the wireless device in accordance with an embodiment of the present disclosure; and, FIG. 6 is a block diagram illustrating an exemplary structure of the wireless device configured in accordance with an embodiment of the present disclosure.

Referring to FIG. 5, there is a flowchart of a method 500 implemented in the wireless device $104_2$ (for example) in accordance with an embodiment of the present disclosure. At step 502, the wireless device $104_2$ receives a signal from the RAN node $102_2$, where the signal has an indication 303 that a network restart has occurred in a CN node $107_1$ (for example) in a pool of CN nodes $107_1, 107_2 \ldots 107_n$ (note: the indication 303 does not necessarily have to indicate the particular CN $107_1$ (for example) that has been restarted but instead just has to indicate that a CN node has been restarted). As discussed above, there are various exemplary ways that the wireless device $104_2$ can perform step 502 some of which are as follows:

(1) The wireless device $104_2$ is operable to receive the indication 303 included in a message that is mapped onto a channel (e.g., BCCH, SCH), which the wireless device $104_2$ periodically wakes up to monitor prior to attempting to receive a paging message, wherein the periodicity of monitoring the channel may be higher (more frequent) than the periodicity that the wireless device $104_2$ uses for monitoring paging messages (see step 502a).

(2) The wireless device $104_2$ is operable to receive the indication 303 included in a message that is mapped onto a channel (e.g., BCCH, SCH), which is periodically monitored by the wireless device $104_2$ while in idle mode, wherein the periodicity of monitoring the channel may be higher (more frequent) than the periodicity that the wireless device $104_2$ uses for monitoring paging messages (see step 502b).

(3) The wireless device $104_2$ is operable to receive the indication 303 via 'in-band' signaling which includes the indication 303 being obtained upon receiving a message where a content of the message does not include the indication 303. In one example, the wireless device $104_2$ is operable to obtain the indication 303 from a supplemental information channel that overlays at least one channel (e.g., SCH or EC-SCH) that is periodically monitored by the wireless device $104_2$, wherein the supplemental information channel signals the indication 303 by (1) using a different modulation symbol rotation or modulation index, or (2) using a bit-wise modulo 2 operation with a known bit pattern (step 502c).

The indication 303 in addition to indicating that a network restart has occurred could also indicate one or more of the following (for example): (1) identify the particular CN node $107_1$ (for example) that has been restarted; (2) identify a longest used paging cycle in a cell to indicate to the wireless device $104_2$ (for example) that a re-registration is not required every time that an indication that a network restart has occurred is signaled during a time period spanned by the longest used paging cycle; and (3) identify a SI version or SI vintage counter.

At step 504, the wireless device $104_2$ transmits to the RAN node $102_2$ a re-registration message 305 (e.g., RAU Request message 305) in response to the receipt of the indication 303 that the network restart has occurred. After transmitting the re-registration message 305, the wireless device $104_2$ completes the RAU procedure along with any additional NAS signaling procedures (e.g., PDP Context Activation) with the appropriate CN node $107_1$ (for example) thereby resulting in the CN node $107_1$ having re-acquired all necessary information for that wireless device $104_2$ subsequent to the CN node $107_1$ experiencing a restart condition. The wireless device $104_2$ by operating in this manner results in a faster and much more paging bandwidth-efficient scheme to address a network restart when compared to the existing mechanism wherein the traditional RAN node informed the individual mobile stations of a network restart event using IMSI-based paging. The other wireless device $104_1, 104_3 \ldots 104_n$ can also be configured in a similar manner to perform method 500.

Figure 6:
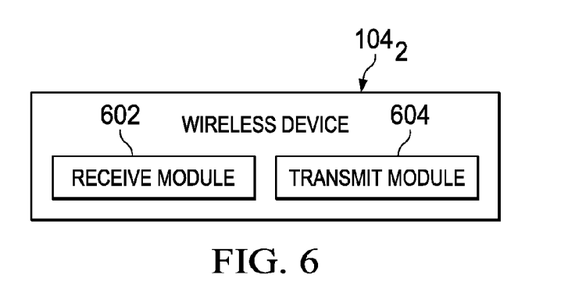

Referring to FIG. 6, there is a block diagram illustrating structures of an exemplary wireless device $104_2$ (for example) configured in accordance with an embodiment of the present disclosure. In one embodiment, the wireless device $104_2$ may comprise a receive module 602, and a transmit module 604. The receive module 602 is configured to receive a signal from the RAN node $102_2$, where the signal has an indication 303 that a network restart has occurred in a CN node $107_1$ (for example) in a pool of CN nodes $107_1, 107_2 \ldots 107_n$ (note: the indication 303 does not necessarily have to indicate the particular CN $107_1$ (for example) that has been restarted but instead just has to indicate that a CN node has been restarted). There are various exemplary ways that the receive module 602 can be configured to receive the indication 303 that the network restart has occurred in a CN node $107_1$ (for example) some of which are as follows:

(1) The receive module 602 is configured to receive the indication 303 included in a message that is mapped onto a channel (e.g., BCCH, SCH), which the wireless device $104_2$ periodically wakes up to monitor prior to attempting to receive a paging message, wherein the periodicity of monitoring the channel may be higher (more frequent) than the periodicity that the wireless device $104_2$ uses for monitoring paging messages (see step $502a$).

(2) The receive module 602 is configured to receive the indication 303 included in a message that is mapped onto a channel (e.g., BCCH, SCH), which is periodically monitored by the wireless device $104_2$ while in idle mode, wherein the periodicity of monitoring the channel may be higher (more frequent) than the periodicity that the wireless device $104_2$ uses for monitoring paging messages (see step $502b$).

(3) The receive module 602 is configured to receive the indication 303 via 'in-band' signaling which includes the indication 303 being obtained upon receiving a message where a content of the message does not include the indication 303. In one example, the wireless device $104_2$ is operable to obtain the indication 303 from a supplemental information channel that overlays at least one channel (e.g., SCH or EC-SCH) that is periodically monitored by the wireless device $104_2$, wherein the supplemental information channel indicates the indication 303 by (1) using a different modulation symbol rotation or modulation index, or (2) using a bit-wise modulo 2 operation with a known bit pattern (step $502c$).

The indication 303 in addition to indicating that a network restart has occurred could also indicate one or more of the following (for example): (1) identify the particular CN node $107_1$ (for example) that has been restarted; (2) identify a longest used paging cycle in a cell to indicate to the wireless device $104_2$ (for example) that a re-registration is not required every time that an indication that a network restart has occurred is signaled during a time period spanned by the longest used paging cycle; and (3) identify a SI version or SI vintage counter.

The transmit module 604 is configured to transmit to the RAN node $102_2$ a re-registration message 305 (e.g., RAU Request message 305) in response to the receipt of the indication 303 that the network restart has occurred. The wireless device $104_2$ can include one or more additional modules which after transmitting the re-registration message 305 can be configured to complete the RAU procedure along with any additional NAS signaling procedures (e.g., PDP Context Activation) with the appropriate CN node $107_1$ (for example) thereby resulting in the CN node $107_1$ having re-acquired all necessary information for that wireless device $104_2$ subsequent to the CN node $107_1$ experiencing a restart condition. The wireless device $104_2$ by operating in this manner results in a faster and much more paging bandwidth-efficient scheme to address a network restart when compared to the existing mechanism wherein the traditional RAN node informed the individual mobile stations of a network restart event using IMSI-based paging. The other wireless devices $104_1, 104_3 \ldots 104_n$ can also be configured in a similar manner with the illustrated structures (or similar structures) of the exemplary wireless device $104_2$ of FIG. 6. The wireless device $104_2$ may also include other components, modules or structures which are well-known, but for clarity, only the components, modules or structures needed to describe the features of the present disclosure are described herein.

As those skilled in the art will appreciate, the above-described modules 602 and 604 of the wireless device $104_2$ may be implemented separately as suitable dedicated circuits. Further, the modules 602 and 604 can also be implemented using any number of dedicated circuits through functional combination or separation. In some embodiments, the modules 602 and 604 may be even combined in a single application specific integrated circuit (ASIC). As an alternative software-based implementation, the wireless device $104_2$ may comprise a memory $120_2$, a processor $118_2$ (including but not limited to a microprocessor, a microcontroller or a Digital Signal Processor (DSP), etc.) and a transceiver $110_2$. The memory $120_2$ stores machine-readable program code executable by the processor $118_2$ to cause the wireless device $104_2$ to perform the steps of the above-described method 500. It should be appreciated that the other wireless devices $104_1, 104_3 \ldots 104_n$ can also be configured in a similar manner as the wireless device $104_2$ to perform method 500.

In view of the foregoing, one skilled in the art will readily appreciate that the aforementioned techniques of the present disclosure are a marked improvement over the prior art in that the disclosed techniques result in a faster and much more paging bandwidth-efficient process for indicating a network restart event to multiple wireless devices when compared to the existing mechanism where the traditional RAN node individually informed each wireless device of a network restart event using the IMSI-based paging technique. Furthermore, the present disclosure, by introducing techniques to signal to wireless device(s) operating in eDRX mode that a core network restart has taken place as well as providing a means for the wireless device(s) to know for how long this signaling will be enabled, provides the following advantages:

The core network is provided with tools to effectively recover from a network error.

The battery life time of the wireless device(s) is enhanced since the wireless device(s) will not need to re-register more than once for the duration of a network restart event.

NAS signaling is reduced since the wireless devices do not need to re-register more than once for the duration of a network restart event.

The new techniques enable the wireless devices that need to perform the RAU procedure (re-registration procedure) to be informed of this without having to reduce the paging capacity through the use of IMSI-based pages. For example, wireless devices that make use of eDRX cycles (e.g., 5 minutes) will wake up according to their nominal paging groups and, at this point, an alternate means of informing them of the need to perform the RAU procedure (re-registration procedure) can be used as described in the present disclosure without having to reduce the paging capacity through the use of IMSI-based pages.

It is to be noted that due to the use of blind repetitions for wireless devices in extended coverage, the use of the legacy IMSI-based method for informing wireless devices of the need to perform the RAU procedure will become even more expensive from a paging capacity reduction perspective (e.g., up to 32 paging blocks may be needed to convey a single IMSI-based page). In this regard, the techniques of the present disclosure are a marked-improvement when compared to the prior art.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A radio access network node configured to interact with a plurality of wireless devices, the radio access network node comprising:
   a processor; and,
   a memory that stores processor-executable instructions, wherein the processor interfaces with the memory to execute the processor-executable instructions, whereby the radio access network node is operable to:
      determine that a network restart has occurred in a core network node in a pool of core network nodes;
      signal, to the wireless devices, an indication that the network restart has occurred, wherein the signal operation further comprises:
         transmit, to the wireless devices, Extended Coverage Synchronization Channel (EC-SCH) content where one or more of six spare bits therein are used to indicate that the network restart has occurred; and
         receive, from at least one of the wireless devices, a re-registration message in response to the signaling of the indication that the network restart has occurred.

2. The radio access network node of claim 1, wherein the indication further identifies at least one of the following:
   the core network node in which the network restart has occurred;
   a longest used paging cycle in a cell to indicate to the wireless devices that a re-registration is not required every time that an indication that a network restart has occurred is signaled during a time period spanned by the longest used paging cycle; and
   a System Information (SI) version or a SI vintage counter.

3. The radio access network node of claim 1, wherein the radio access network node is operable to signal the indication by mapping a message including the indication onto a channel, which each of the wireless devices periodically wakes up to monitor prior to attempting to receive a paging message.

4. The radio access network node of claim 1, wherein the radio access network node is operable to signal the indication by mapping a message including the indication onto a channel, which is periodically monitored by each of the wireless devices while in idle mode.

5. The radio access network node of claim 1, wherein the radio access network node is operable to signal the indication by 'in-band' signaling that includes signaling the indication in conjunction with a transfer of a message without changing a content of the message.

6. The radio access network node of claim 5, wherein the 'in-band' signaling includes overlaying at least one channel which is periodically monitored by each of the wireless devices with a supplemental information channel that signals the indication by (1) using a different modulation symbol rotation or modulation index, or (2) using a bit-wise modulo 2 operation with a known bit pattern.

7. The radio access network node of claim 1, wherein the signal operation further comprises: transmit, to the wireless devices, one or more System Information (SI) messages to identify the core network node that has restarted.

8. A method in a radio access network node configured to interact with a plurality of wireless devices, the method comprising:
   determining that a network restart has occurred in a core network node in a pool of core network nodes;
   signaling, to the wireless devices, an indication that the network restart has occurred, wherein the signaling step further comprises:
      transmitting, to the wireless devices, Extended Coverage Synchronization Channel (EC-SCH) content where one or more of six spare bits therein are used to indicate that the network restart has occurred; and
      receiving, from at least one of the wireless devices, a re-registration message in response to the signaling of the indication that the network restart has occurred.

9. The method of claim 8, wherein the indication further identifies at least one of the following:
   the core network node in which the network restart has occurred;
   a longest used paging cycle in a cell to indicate to the wireless devices that a re-registration is not required every time that an indication that a network restart has occurred is signaled during a time period spanned by the longest used paging cycle; and
   a System Information (SI) version or a SI vintage counter.

10. The method of claim 8, wherein the signaling step further comprises mapping a message including the indication onto a channel, which each of the wireless devices periodically wakes up to monitor prior to attempting to receive a paging message.

11. The method of claim 8, wherein the signaling step further comprises mapping a message including the indication onto a channel, which is periodically monitored by each of the wireless devices while in idle mode.

12. The method of claim 8, wherein the signaling step further comprises 'in-band' signaling that includes signaling the indication in conjunction with a transfer of a message without changing a content of the message.

13. The method of claim 12, wherein the 'in-band' signaling includes overlaying at least one channel which is periodically monitored by each of the wireless devices with a supplemental information channel that signals the indication by (1) using a different modulation symbol rotation or modulation index, or (2) using a bit-wise modulo 2 operation with a known bit pattern.

14. The method of claim 8, wherein the signaling step further comprises: transmitting, to the wireless devices, one or more System Information (SI) messages to identify the core network node that has restarted.

15. A wireless device configured to interact with a radio access network node, the wireless device comprising:
   a processor; and,
   a memory that stores processor-executable instructions, wherein the processor interfaces with the memory to execute the processor-executable instructions, whereby the wireless device is operable to:
      receive, from the radio access network node, an indication that a network restart has occurred in a core network node in a pool of core network nodes, wherein the receive operation further comprises:
         receive, from the radio access network node, Extended Coverage Synchronization Channel (EC-SCH) content where one or more of six spare bits therein are used to indicate that the network restart has occurred; and
      determine that the network restart has occurred; and
      transmit, to the radio access network node, a re-registration message in response to the determination that the network restart has occurred.

16. The wireless device of claim 15, wherein the indication further identifies at least one of the following:
   the core network node in which the network restart has occurred;
   a longest used paging cycle in a cell to indicate to the wireless device that a re-registration is not required every time that an indication that a network restart has occurred is signaled during a time period spanned by the longest used paging cycle; and
   a System Information (SI) version or a SI vintage counter.

17. The wireless device of claim 15, wherein the wireless device is operable to receive the indication included in a message mapped onto a channel, which the wireless device periodically wakes up to monitor prior to attempting to receive a paging message.

18. The wireless device of claim 15, wherein the wireless device is operable to receive the indication included in a message mapped onto a channel, which is periodically monitored by the wireless device while in idle mode.

19. The wireless device of claim 15, wherein the wireless device is operable to receive the indication via 'in-band' signaling which includes receiving the indication in conjunction with receiving a message where a content of the message does not include the indication.

20. The wireless device of claim 19, wherein the wireless device is operable to obtain the indication from a supplemental information channel that overlays at least one channel periodically monitored by the wireless device, wherein the supplemental information channel signals the indication by (1) using a different modulation symbol rotation or modulation index, or (2) using a bit-wise modulo 2 operation with a known bit pattern.

21. The wireless device of claim 15, wherein the receive operation further comprises: receive, from the radio access network node, one or more System Information (SI) messages to identify the core network node that has restarted.

22. A method in a wireless device configured to interact with a radio access network node, the method comprising:
   receiving, from the radio access network node, an indication that a network restart has occurred in a core network node in a pool of core network nodes, wherein the receiving step further comprises:
      receiving, from the radio access network node, Extended Coverage Synchronization Channel (EC-SCH) content where one or more of six spare bits therein are used to indicate that the network restart has occurred; and
   determining that the network restart has occurred; and
   transmitting, to the radio access network node, a re-registration message in response to the determination that the network restart has occurred.

23. The method of claim 22, wherein the indication further identifies at least one of the following:
   the core network node in which the network restart has occurred;
   a longest used paging cycle in a cell to indicate to the wireless device that a re-registration is not required every time that an indication that a network restart has occurred is signaled during a time period spanned by the longest used paging cycle; and
   a System Information (SI) version or a SI vintage counter.

24. The method of claim 22, wherein the receiving step further comprises receiving the indication included in a message mapped onto a channel, which the wireless device periodically wakes up to monitor prior to attempting to receive a paging message.

25. The method of claim 22, wherein the receiving step further comprises receiving the indication included in a message mapped onto a channel, which is periodically monitored by the wireless device while in idle mode.

26. The method of claim 22, wherein the receiving step further comprises receiving the indication via 'in-band' signaling which includes receiving the indication in conjunction with receiving a message where a content of the message does not include the indication.

27. The method of claim 26, wherein the wireless device obtains the indication from a supplemental information channel that overlays at least one channel periodically monitored by the wireless device, wherein the supplemental information channel signals the indication by (1) using a different modulation symbol rotation or modulation index, or (2) using a bit-wise modulo 2 operation with a known bit pattern.

28. The method of claim 22, wherein the receiving step further comprises: receiving, from the radio access network node, one or more System Information (SI) messages to identify the core network node that has restarted.

* * * * *